United States Patent [19]

Takahata et al.

[11] Patent Number: 4,910,792
[45] Date of Patent: Mar. 20, 1990

[54] UP-LINK POWER CONTROL IN SATELLITE COMMUNICATIONS SYSTEM

[75] Inventors: Fumio Takahata; Mitsuo Nohara, both of Tokyo; Yoshio Takeuchi, Kanagawa, all of Japan

[73] Assignee: Kokusai Denshin Denwa Co., Ltd., Tokyo, Japan

[21] Appl. No.: 84,244

[22] Filed: Aug. 12, 1987

[30] Foreign Application Priority Data

Aug. 14, 1986 [JP] Japan .................................. 61-189663

[51] Int. Cl.⁴ ............................................. H04B 7/185
[52] U.S. Cl. ........................................ 455/10; 455/12; 455/52; 455/69
[58] Field of Search .................. 455/10, 12, 52, 69, 455/63, 67; 370/69.1, 75

[56] References Cited

U.S. PATENT DOCUMENTS

| | | | |
|---|---|---|---|
| 4,287,598 | 9/1981 | Langseth et al. | 455/10 |
| 4,613,990 | 9/1986 | Halpern | 455/52 |
| 4,697,187 | 9/1987 | Ohno et al. | 455/12 |
| 4,720,873 | 1/1988 | Goodman et al. | 455/12 |
| 4,731,870 | 3/1988 | Black et al. | 455/12 |
| 4,731,886 | 3/1988 | Muratani et al. | 455/10 |
| 4,752,967 | 6/1988 | Bustamante et al. | 455/10 |

Primary Examiner—Benedict V. Safourek
Assistant Examiner—Curtis Kuntz
Attorney, Agent, or Firm—Armstrong, Nikaido, Marmelstein, Kubovcik & Murray

[57] ABSTRACT

An up-link power from an earth station in a satellite communication system is controlled to compensate rain attenuation caused in an up-link so that the transmission power of the earth station is adjusted according to the difference between the level of a received reference signal, which is sent from a reference earth station to the satellite, and the level of its own received signal which is transmitted to the satellite from itself and is received at its own station after being relayed by the satellite. A transmission power of the reference earth station is adjusted so that the level of the received reference signal at the satellite is constant.

12 Claims, 12 Drawing Sheets

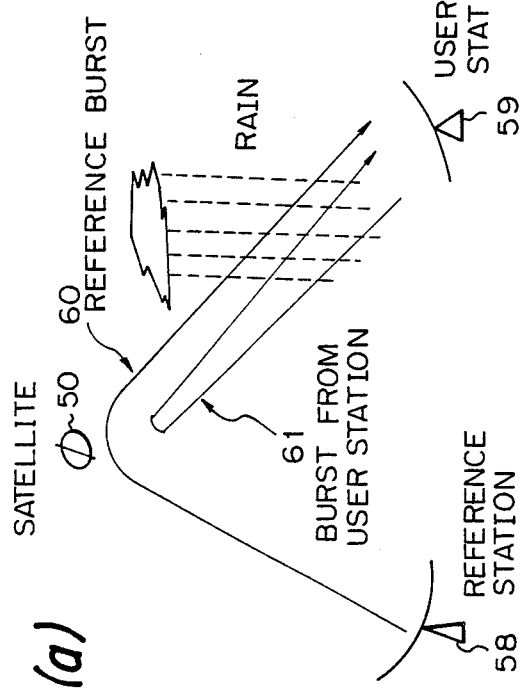
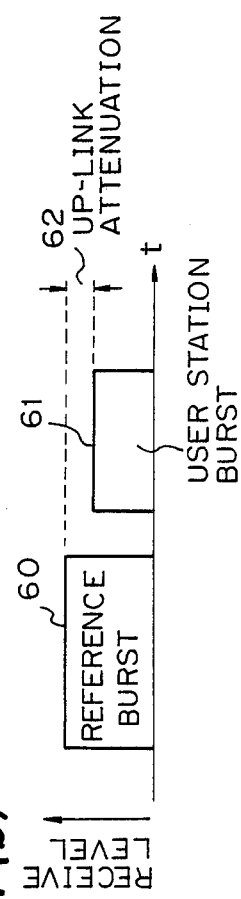
Fig. 4(a)
Fig. 4(b)

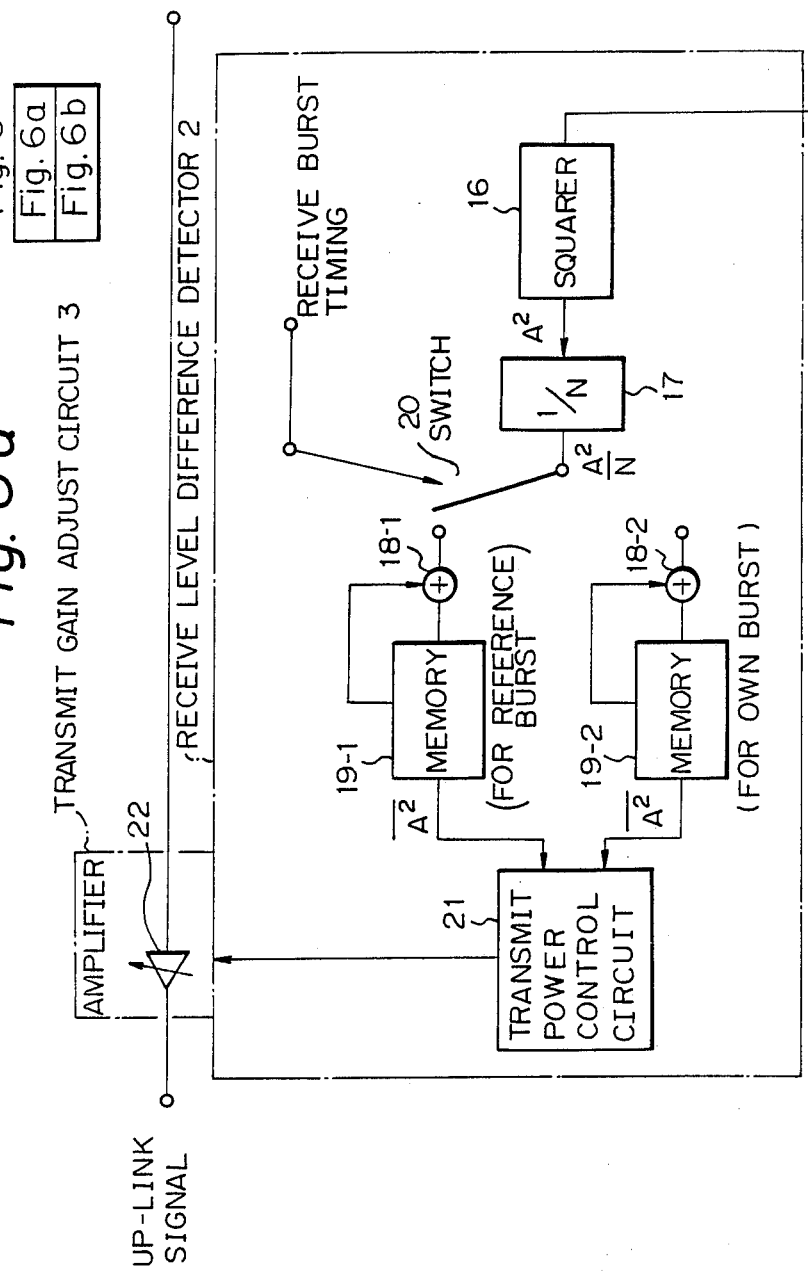

UP-LINK POWER CONTROL IN SATELLITE COMMUNICATIONS SYSTEM

BACKGROUND OF THE INVENTION

The present invention relates to an up-link power control system in an earth station in a satellite communications, in particular, relates to a system in which a signal power received at a satellite is constant even when heavy rain attenuates an up-link power from an earth station to the satellite, by increasing the transmission power of the earth station.

Conventionally, the radio frequency band used in an international satellite communication system is 6/4 GHz, and 1.6/1.5 GHz in an international maritime satellite communication system. An attenuation caused by rainfall in those frequency bands is not very large, except for a rare heavy rainfall condition.

It is a tendency that a higher frequency band is used so as to cope with a rapid increase of traffic, and incorporate small earth stations with small antennas in satellite communication systems. For instance, a Ku band (14/11 GHz), and/or a Ka band (30/20 GHz) is to be used. The rain attenuation in those high frequency bands is considerably larger, and a transmission power control for compensating the rain attenuation is essentially necessary.

A transmission power control is carried out on the total transmission power in an up-link from an earth station so that a satellite receives signals with constant power from the earth station. As for a down-link from the satellite to the earth station, a link design in the satellite communication systems is carried out so that a satisfactory transmission quality is obtained even when the down-link is subject to rain attenuation. Therefore, the transmission power control is not usually carried out totally compensate attenuations both in the up- and the down-links. Controlling only a power in the up-link transmitted from the earth station is called an up-link power control.

It should be noted that the satellite is a mere repeater of signals, but has no facility to measure the power transmitted from each earth station. Therefore, when an earth station controls its transmission power, the earth station has no information about the up-link attenuation, so, an accurate up-link power control is impossible.

In order to solve this problem, two solutions has been proposed.

(1) The correlativity between the up- and down-link attenuations is applied, and the up-link attenuation is presumed, using the attenuation measured in the down-link.

(2) The up-link attenuation is calculated by subtracting the down-link attenuation from a sum of up- and down-link attenuations.

Problems of those two methods are analyzed in the following.

FIG. 1 shows a block diagram of a satellite communications sytem which carries out the above method (1).

A beacon signal transmitted from the satellite 50 is received at the beacon receiver 51, which detects the level of the received beacon signal, and compares the level with a nominal received level to obtain a down-link attenuation. The up-link attenuation estimation circuit 52 presumes an up-link attenuation, based upon the measured down-link attenuation. The transmission power from the transmitter 53 is determined, based upon the value presumed by the estimation circuit 52. A down-link attenuation measured by the beacon receiver 51 does not directly represent the up-link attenuation, because the up-link frequency differs from the down-link frequency. Therefore, the up-link attenuation should be presumed using not only the measured down-link attenuation, but also a correlativity between the up- and down-link attenuations derived from past measurements and experiences.

However, a relationship between the rain attenuation and the frequency bands varies, depending upon the rainfall conditions, and/or the locations of the earth stations, and so, an uniform relationship is not applicable to all the earth stations. Thus, it has been impossible to estimate the up-link attenuation accurately. Furthermore, the method (1) has a disadvantage that the beacon signal generator 49 on-board the satellite is generally unstable, and so, the transmission power of the beacon signal itself fluctuates.

FIG. 2 shows a block diagram for carrying out the method (2). In this method, an earth station transmits a pilot signal generated in the pilot oscillator 54 to a satellite 50. The pilot receiver 56 receives the pilot signal which is relayed by the satellite 50, and measures a power level of the received pilot signal. Simultaneously, the beacon receiver 55 measures a level of a received beacon signal. The power difference detector 57 detects a difference between the levels of the received beacon and pilot signals. The detected difference is considered as an up-link attenuation. The transmission power from the transmitter 53 is controlled based upon the calculated up-link attenuation. This method has an advantage that a correlativity between the up- and down-link attenuations is not used, and so, no error caused by the presumption occurs. However, it still has a problem of fluctuation of the beacon signal generated on-board the satellite. Furthermore, it has a disadvantage because all earth stations have to transmit pilot signals to the satellite. This results in an unefficient utilization of frequency bands.

SUMMARY OF THE INVENTION

It is an object of the present invention to provide a new and improved up-link power control system.

It is also an object of the present invention to provide an up-link power control system in a satellite communication system, in which earth stations may control up-link powers easily without an additional beacon signal so that the rain attenuation is compensated.

The above and other objects are attained by an up-link power control system in a satellite communication system incorporating a plurality of earth stations, including at least one reference station, and at least one satellite for relaying signals among the earth stations. The reference earth station has a device for controlling the transmission power of a reference signal so that the level of the received reference signal at the satellite is constant. Each of the earth stations except the reference earth station has a device for detecting the difference between the level of the received reference signal from the reference earth station through the satellite, and the level of a received signal which is sent from itself and relayed by the satellite. Each of the earth stations, except the reference earth station controls the up-link power based upon the difference.

BRIEF DESCRIPTION OF THE DRAWINGS

The foregoing and other objects, features, and attendant advantages of the present invention will be appreciated as the same become better understood by means of the following description and accompanying drawings wherein;

FIGS. 4a and 4b show the general idea of the present invention, when the present invention is applied to a TDMA operation, FIGS. 6a and 6b are block diagrams of an up-link power control system according to the present invention.

DESCRIPTION OF THE PREFERRED EMBODIMENTS

Figure 1:
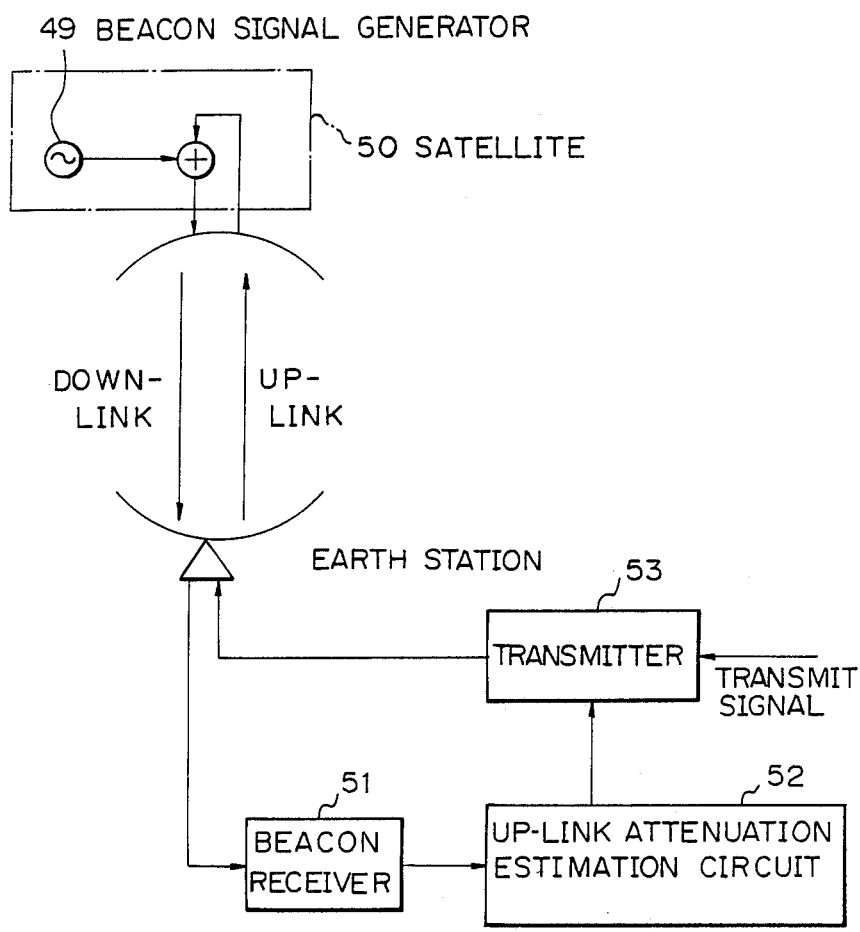
FIG. 1 is a block diagram of a prior up-link power control system.
Figure 2:
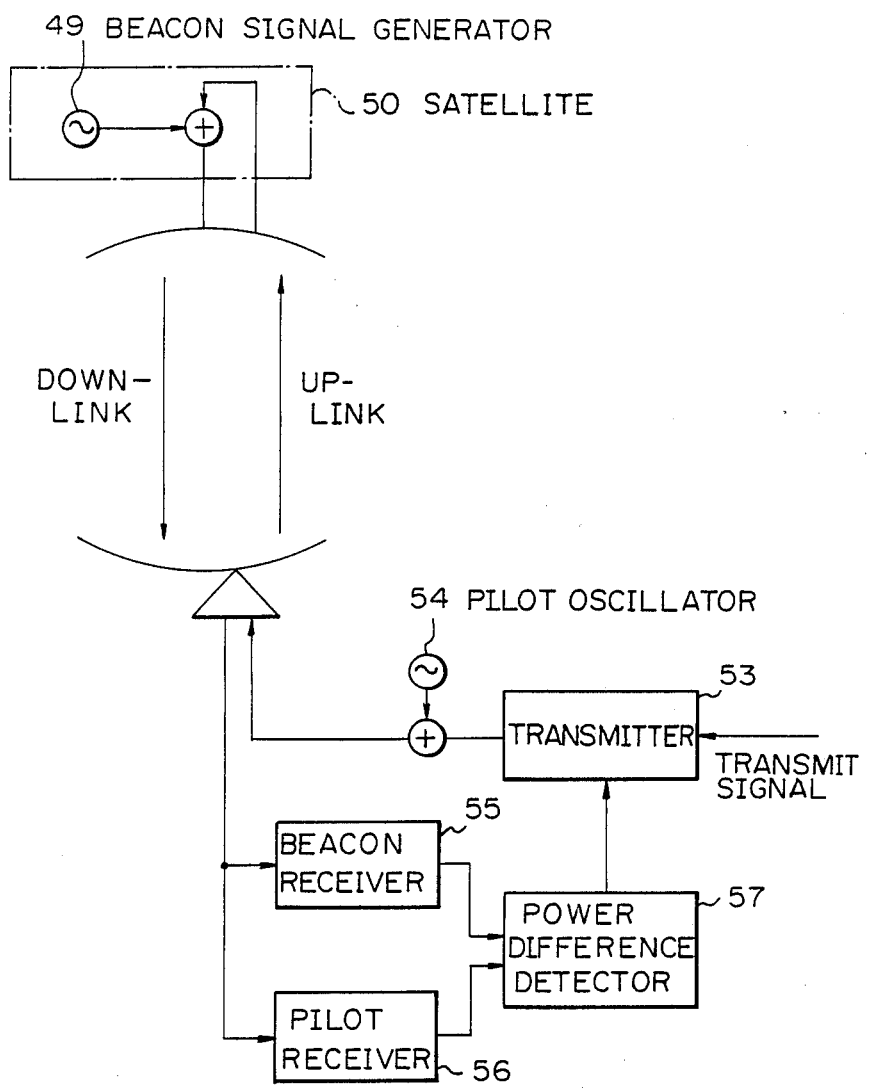
FIG. 2 is a block diagram of another prior up-link power control system.
Figure 3:
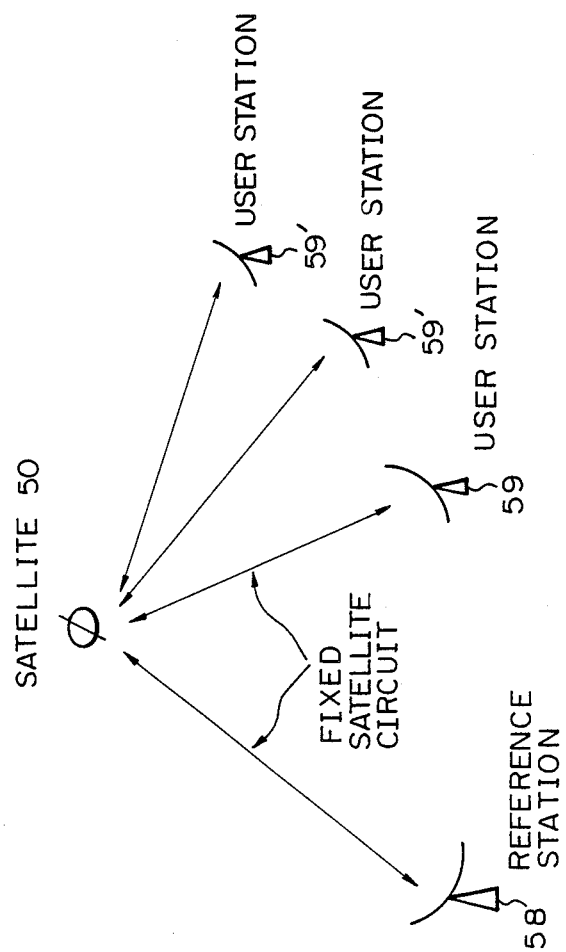
FIG. 3 shows the general concept of the present invention.

The concept of the present invention is described in accordance with FIG. 3. The satellite communication system in FIG. 3 has a satellite 50, a reference earth station 58, and a plurality of user stations 59. A fixed satellite circuit is provided between the reference station 58 and the user stations 59 through the satellite 50 for communicating system information with each other. Each user station 59 is able to receive not only the signal sent from the reference earth station 58, but also the signal sent from the user station itself 59.

FIG. 4 shows the general concept of the present invention, when the system operates in a TDMA (Time Division Multiple Access) mode. In the TDMA communication system, a reference burst signal 60, sent from the reference earth station 58, is used as a time reference on a time scale. The time slots 61 are assigned to user stations 59 in accordance with the time reference of the reference burst 60. When it is assumed that it rains between the satellite 50 and one of the user stations 59, the reference burst 60 from the reference station 58 is received at the user station 59 with attenuation caused only in the down-link, and the burst 61 sent from the user station 59 is received at the user station with the attenuation caused in both the up- and down-links. Therefore, the difference at the user station 59 between the levels of the received reference burst signal 60, and the user station burst 61 sent from the user station itself is the attenuation 62 in the up-link due to the rain, as shown in FIG. 4(b). Therefore, the user station 59 adjusts the transmission power of the burst from its own station so that the level of the received reference burst 60 coincides with the level of the received user station burst 61 from the station itself. Then, the level of the received reference burst coincides with the level of the received user station burst at the satellite.

As for the rain attenuation in the down-link, the link design in the satellite communication system is made with enough margin for that attenuation, and a particular compensation system for the down-link is not usually introduced as described before.

The present invention has an assumption that the level of the received reference burst transmitted from the reference earth station is always constant at the satellite. The user stations 59 adjust the transmission power of each station under this assumption.

The accuracy of the up-link power control in the present invention depends only upon the accuracy of the transmission power from the reference earth station 58. Since the reference earth station is installed in a fixed location, satisfactory accuracy of the control is obtained even when an empirical relationship between the up- and down-link attenuations is applied. The control of the up-link power in the reference earth station may be quite accurate, when no beacon signal is utilized, but a plurality of user stations 59 return to the reference earth station 58 the levels of the received reference burst sent from the reference earth station, since a possibility that the down-links in all the user stations suffer from rain attenuation simultaneously is quite small.

Although FIG. 4 assumes a TDMA operation, the present invention is also applicable to other communication systems operated at an FDMA (Frequency Division Multiple Access) mode in which a plurality of references are utilized.

Figure 5:
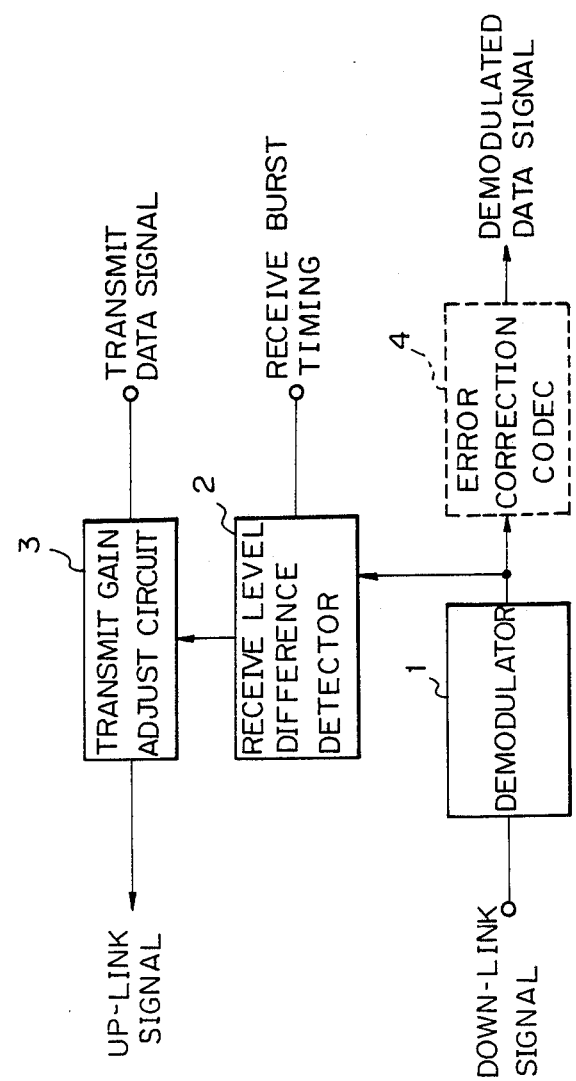
FIG. 5 is a block diagram of a user station according to the present invention.

FIG. 5 shows a block diagram for adjusting a transmission power for the up-link in a user station, when the satellite circuit operates in a TDMA mode. The up-link power control system shown in FIG. 5 consists of a demodulator 1 for demodulating a down-link signal, a receive level difference detector 2 for detecting a difference of levels between the received reference burst and its own received burst based upon the receive timing of those bursts, and the transmit gain adjust circuit 3. The circuit shown in FIG. 5 operates so that the receive level difference detector 2 provides information about the level difference between the received reference burst and the its own received burst, and the transmit power is adjusted according to the information. FIG. 5 also has an error correction codec 4 linked to an output port of the demodulator 1 to correct errors contained in the output signal from the demodulator 1. The demodulator 1 is necessary irrespective of the up-link power control of the present invention, for demodulating a signal transmitted from the reference earth station, and/or for establishing a burst synchronization by detecting a position of the its own received burst. The addition of only the receive level difference detector 2 to a prior system can implement the present invention. When the output from the demodulator 1 is a digital signal, it should be noted that the level difference is easily calculated.

Figure 6B:
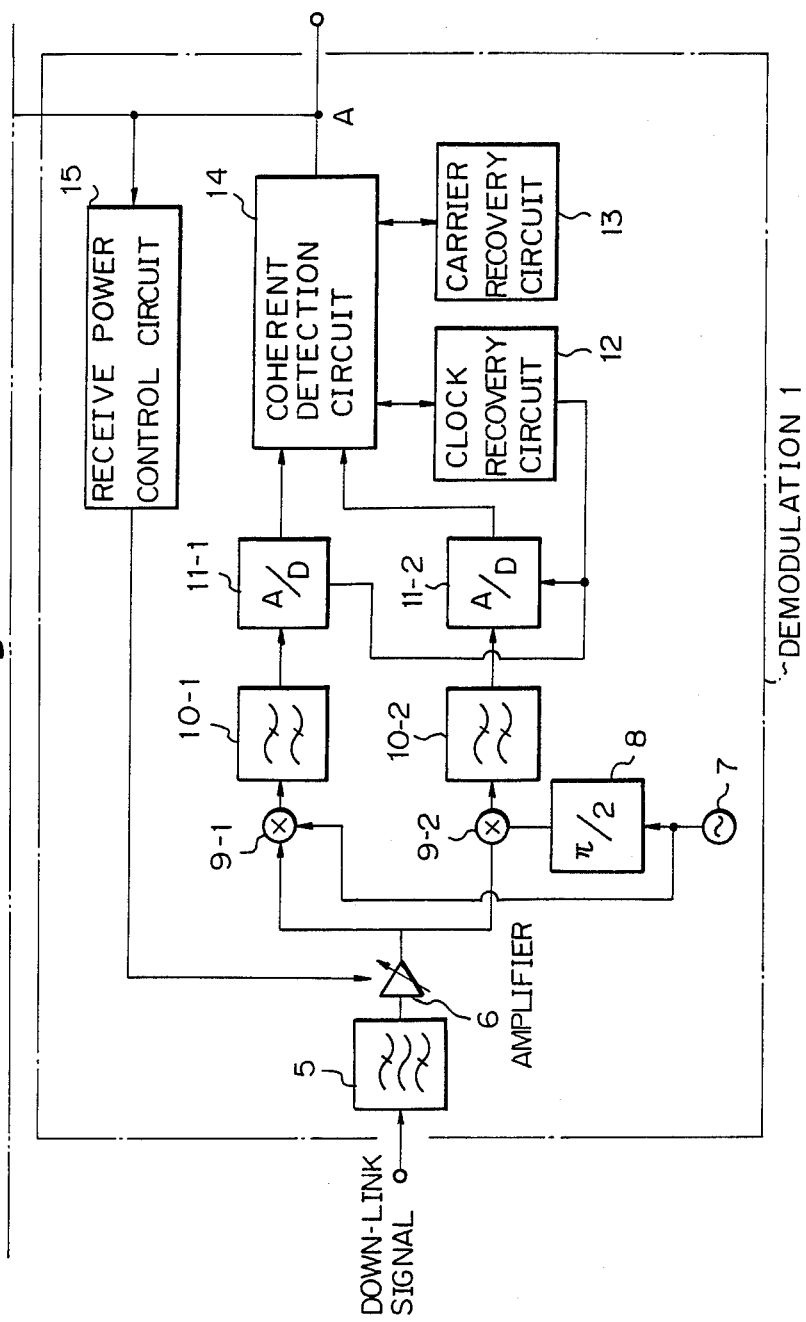

FIG. 6 is a block diagram of a practical circuit according to the present invention, in which the demodulator is realized by a quasi-coherent demodulation based upon digital signal processing techniques. The demodulator 1 consists of a bandpass filter 5 for extracting a signal component, an amplifier 6 for compensating a power attenuation caused in the down-link, a sinusoidal signal oscillator 7, a phase shifter 8 and a pair of multipliers 9-1 and 9-2 for converting a received analog signal in an IF (Intermediate Frequency) band to analog baseband signals by multiplying the received IF signal with a pair of sinusoidal signals with a 90° phase difference, a pair of low-pass filters 10-1 and 10-2 for removing unnecessary outband components, a pair of analog-digital converters 11-1 and 11-2 for converting the analog baseband signals to digital signals, a clock recovery circuit 12 and a carrier recovery circuit 13 for regenerating a clock signal and a carrier signal from the digital baseband signals, a coherent detection circuit 14 for regenerating a data signal based upon a coherent detection with the recovered clock and the recovered carrier, and a receive power control 15 for controlling the amplifier 6 by detecting an attenuation caused in the down-link from the regenerated data signal.

The receive level difference detector 2 carries out statistical processing on the output data signal from the demodulator 1.

FIG. 6 shows the embodiment in which the mean square $\overline{A^2}$ of output data samples A from the demodulator 1 is used to provide the difference of the levels between the received reference burst and its own received burst.

The receive level difference detector 2 consists of the squarer 16 for calculating a square $A^2$ of the output data sample A from the demodulator 1, the divider 17 for dividing $A^2$ by N to obtain the mean value $\overline{A^2}$ from N number of square data samples $A^2$, a pair of adders 18-1 and 18-2 for accumulating N number of output data samples ($A^2/N$) from the divider 17, a pair of memories 19-1 and 19-2 for storing respective sums calculated in the adders 18-1 and 18-2, a switch 20 for exchanging the data samples derived from the reference burst and from its own burst to the respective different memories 19-1 and 19-2 according to the burst timing, and the transmit power control circuit 21 for calculating the level difference between the reference burst and its own burst from the data stored in the memories 19-1 and 19-2, and providing a control information for the up-link power control.

Therefore, the portion of the squarer 16, the divider 17, the switch 20, the adders 18-1 and 18-2, and the memories 19-1 and 19-2 provide the mean square value $$\overline{A^2} \left( = \sum_{i=1}^{N} \frac{A_i^2}{N} \right).$$

The total time for accumulating the data samples is in the range from one second to 10 seconds, during which the rain condition is supposed to be constant.

The transmit gain adjust circuit 3 is composed by the adjustable amplifier 22 which is controlled by the information supplied from the transmit power control circuit 21. In the configuration shown in FIG. 6, the received power level is recognized by the total component A involving the signal component and the noise component generated in the satellite link.

Figure 7:
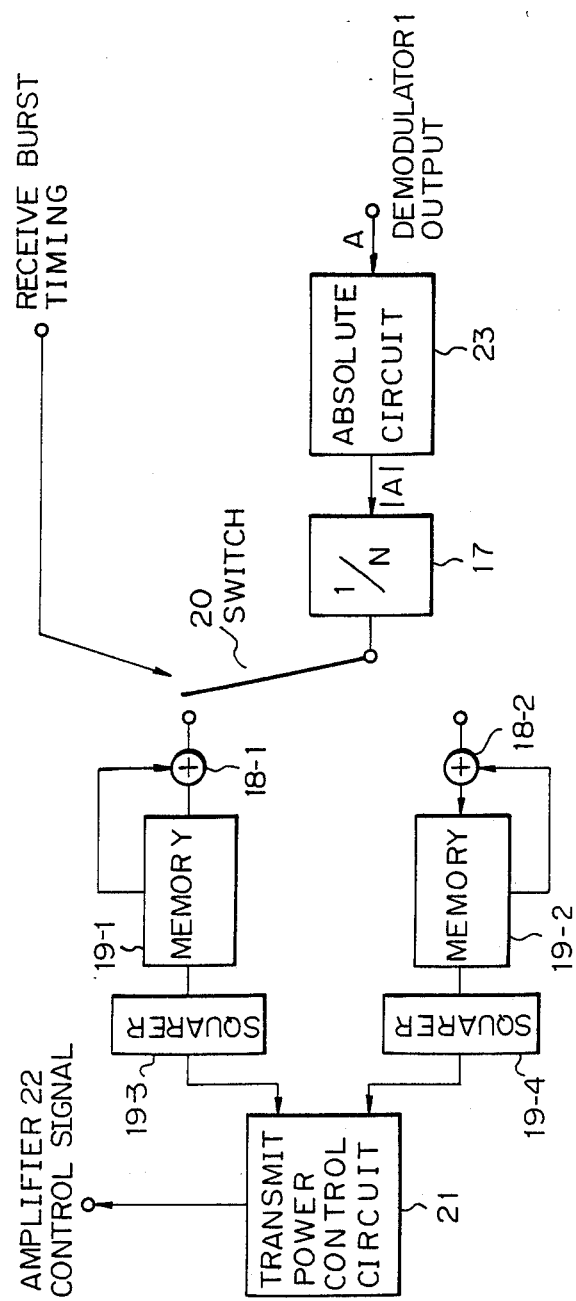
FIG. 7 is a modification of FIG. 6, FIGS. 8a and 8b are block diagrams of another embodiment according to the present invention.

FIG. 7 is a modification of FIG. 6. FIG. 7 has the feature that the level difference is calculated based upon the square $(|\overline{A}|)^2$ of the absolute $|A|$ of A. The squarer 16 in FIG. 6 is substituted in FIG. 7 by the absolute circuit 23 which provides the absolute $|A|$ of the output data sample A from the demodulator 1. The embodiment of FIG. 7 operates with the mean value $|\overline{A}|$ of the absolute $|A|$ so that the effect of the noise is removed and the level difference of pure signal components between the reference burst and its own burst is obtained. The squarers 19-3 and 19-4 are inserted between the memories 19-1 and 19-2 and the transmit power control circuit 21 so that the circuit operates with the square $(|\overline{A}|)^2$ of the mean value $|\overline{A}|$.

Further, the combination of $\overline{A^2}$ and $(|\overline{A}|)^2$ may be used so that the received power level difference is calculated from the noise power component $(\overline{A^2} - |\overline{A}|^2)$ after the signal powers $(|\overline{A}|)^2$ of the reference burst and its own burst are coincident with each other.

Further, it should be noted that the output signals from the A/D converters (11-1, 11-2) may be used, as an input signal to the receive level difference detector 2, instead of the output data signal from the demodulator 1.

When the control is carried out on digital data samples as stated above, its processing is realized with a programmed computer, and the receive level difference detector 2 may be implemented by means of a single chip microprocessor which loads a program.

When the demodulator 1 is implemented based upon analog signal processings, the receive level difference detector 2 is implemented by the combination of a rectifier circuit with diodes, an integrator circuit with resistors and capacitors, etc.

Further, it should be noted that the received level difference may be calculated based upon a relationship between C/N (carrier to noise) ratios of the reference burst and its own burst, and bit error characteristics of the error correction codec 4.

Figure 8A:
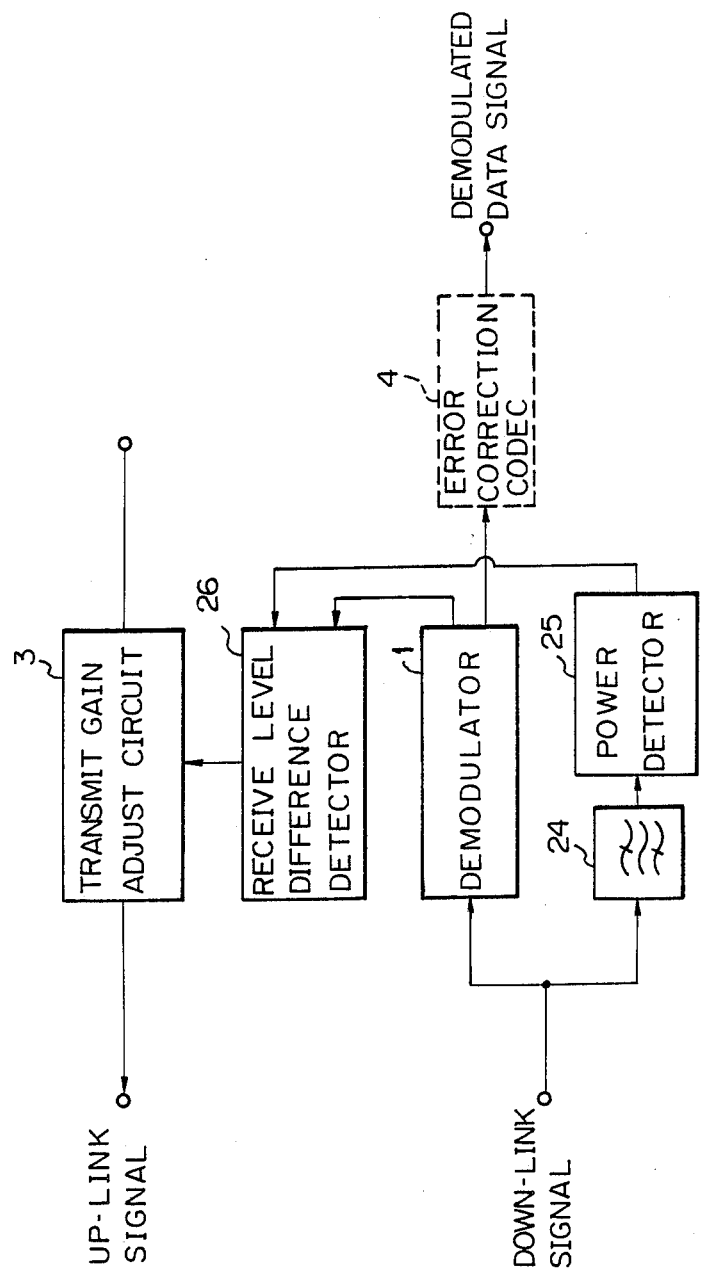

FIG. 8a shows a block diagram of the present invention when the satellite circuit operates in an FMDA mode. In this configuration, the bandpass filter 24 and the power detector 25 for detecting a received power level of a signal transmitted from itself are necessary in addition to the demodulator 1 for demodulating a reference continuous signal sent from the reference earth station.

Figure 8B:
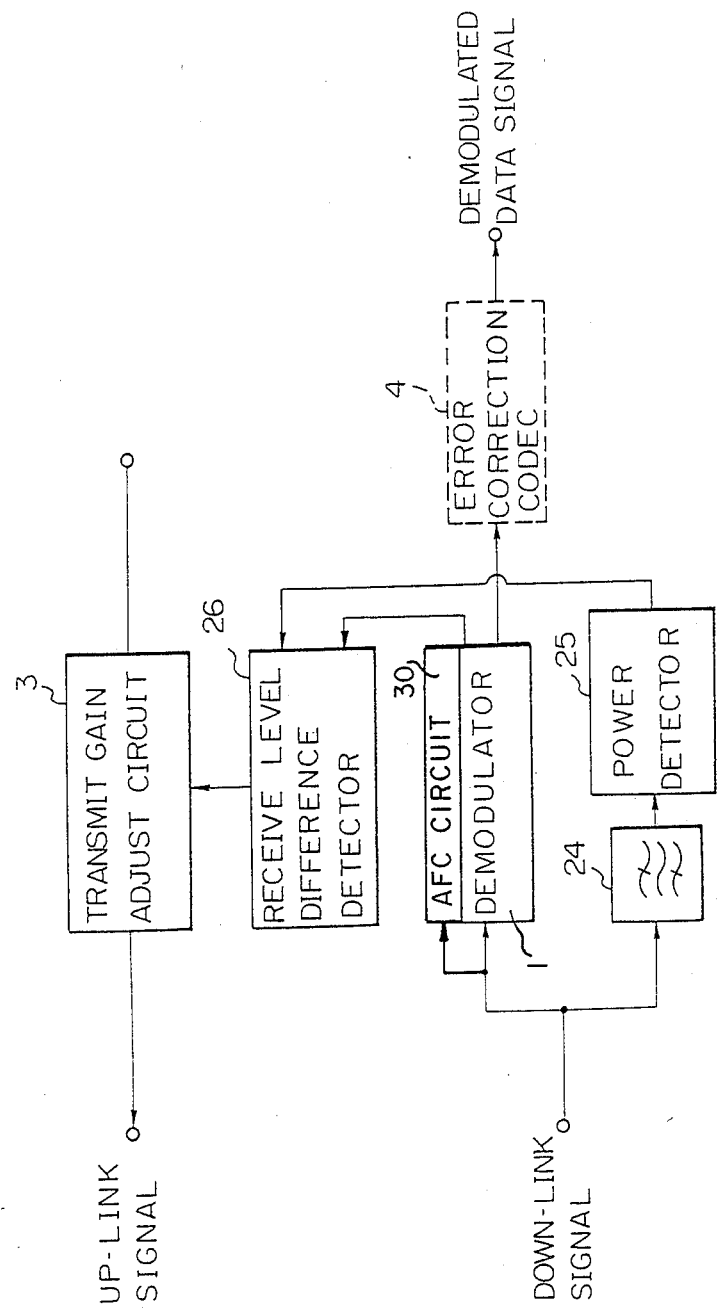
Figure 9:
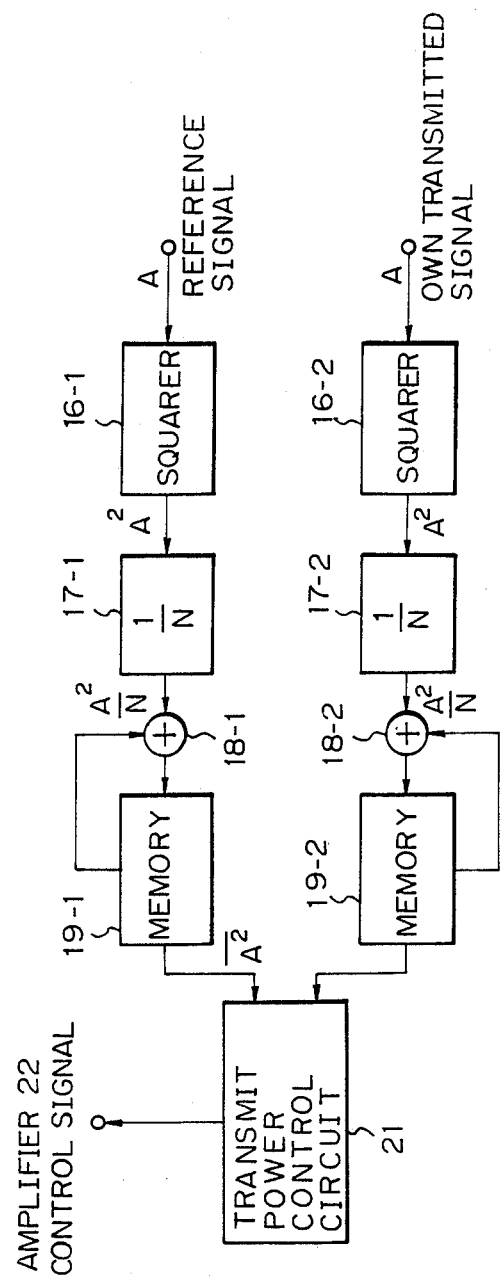
FIG. 9 is a block diagram of the receive level difference detector.

FIG. 9 is a block diagram of the receive level difference detector 26 applicable to the configuration shown in FIG. 8a. In comparing the configuration shown in FIG. 9 with that in FIG. 6, the configuration shown in FIG. 9 has a pair of series circuits of squarers (16-1 and 16-2) and dividers (17-1 and 17-2), and has no switch 20 in FIG. 9. The receive level difference detector 26 shown in FIG. 8 may operate based upon $A^2$, $(|\overline{A}|)^2$ or $(\overline{A^2} - (|\overline{A}|)^2)$.

In the case of the FDMA operation, a signal flowing in the AFC (Automatic Frequency Control) 30 circuit (FIG. 8b) is applicable to the up-link power control. Since the pilot signal for the AFC transmitted from the reference earth station is sinusoidal, no demodulator 1 is necessary, and the received power level is obtained by using a signal flowing in the AFC circuit.

Figure 10:
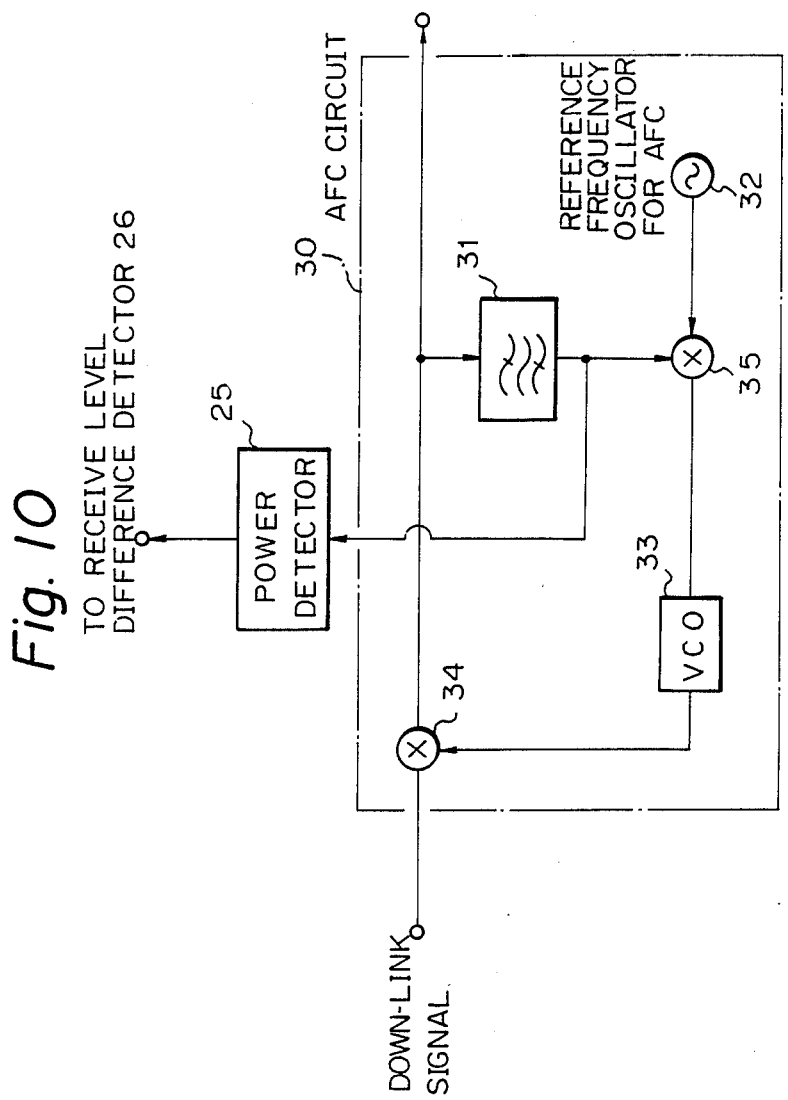
FIG. 10 is a block diagram of an AFC circuit.

FIG. 10 shows a block diagram of the AFC circuit 30. The output signal from the bandpass filter 31 which is originally utilized to derive the pilot signal in the AFC circuit, is used as a signal sent from the reference station.

The present invention has the advantage that the transmission power is controlled accurately, as compared with the prior art which controls the transmission power in the up-link based upon a beacon signal transmitted from a satellite and/or a pilot signal transmitted from itself. The additional circuit for implementing the present invention is merely the receive level difference detector. A demodulator is inherently necessary in a prior satellite communication system, and so, no additional demodulator is necessary for implementing the present invention. In particular, when the system operates in the TDMA mode, the present invention is implemented with few additional circuits.

From the foregoing it will now be apparent that a new and improved up-link power control system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An up-link power control system in a satellite communication system having a plurality of earth stations, including at least one reference earth station, and at least one satellite for relaying signals among the earth stations, said up-link power control system comprising:
   transmission power control means for controlling transmission power of a reference signal of said reference earth station so that a level of a received reference signal at the satellite is constant;
   each of the earth stations, except the reference earth station, having level difference detecting means for detecting the received level difference between a level of said received reference signal from the reference earth station through the satellite, and a level of a received signal which is sent from each earth station back to itself relayed by the satellite; and
   each of the earth stations, except the reference earth station, controlling its own transmission power depending upon said difference.

2. An up-link power control system according to claim 1, wherein said level difference detecting means is carried out using signals contained in a demodulator and/or an automatic frequency control (AFC) circuit which are equipped in each of the earth stations except the reference earth station.

3. An up-link power control system according to claim 1, wherein said level difference detecting means comprises:
   a squarer for squaring the received reference signal and its own received signal contained in said demodulator and/or said AFC signal;
   a divider for providing 1/N of an output signal from said squarer where N is an integer;
   a switch for switching an output signal from said divider to two branches, according to a received timing;
   a first accumulation circuit with a first memory and a first adder coupled with one branch of said switch for providing a mean square value $\overline{A}^2$ of the reference signal;
   a second accumulation circuit with a second memory and a second adder coupled with another branch of said switch for providing a mean square value $\overline{A}^2$ of its own signal;
   a transmit power control circuit for providing control information of transmission power according to a difference between outputs from said first accumulation circuit and said second accumulation circuit.

4. An up-link power control system according to claim 1, wherein said level difference detecting means comprises:
   an absolute circuit for providing an absolute value $|A|$ of the received reference signal and its own received signal contained in said demodulator and/or said AFC circuit;
   a divider for providing 1/N of an output signal from said absolute circuit where N is an integer;
   a switch for switching an output signal from said divider to two branches, according to a received timing;
   a first accumulation circuit with a first memory and a first adder coupled with one branch of said switch for providing a mean absolute value $|\overline{A}|$ of the reference signal;
   a second accumulation circuit with a second memory and a second adder coupled with another branch of said switch for providing a mean absolute value $|\overline{A}|$ of its own signal;
   a pair of squarers coupled with outputs of said accumulation circuits, respectively; and
   a transmit power control circuit for providing control information of the transmission power according to a difference between outputs $(|\overline{A}|)^2$ from said squarers.

5. An up-link power control system according to claim 3, wherein said level difference detecting means is realized based upon the combination of mean square values $\overline{A}^2$ of the reference and its own signals.

6. An up-link power control system according to claim 1, wherein said level difference detecting means is realized based upon a relationship between carrier-to-noise ratios of the reference and its own signals and bit error characteristics of an error correction codec.

7. An up-link power control system according to claim 1, wherein said level different detecting means for comprises microprocessors loading a program to achieve calculations.

8. An up-link power control system according to claim 1, wherein said reference earth station controls transmission power according to a received level of a beacon signal transmitted from the satellite, and/or received level of the reference signal from the reference earth station through the satellite.

9. An up-link power control system according to claim 1, wherein said reference earth station controls transmission power according to information concerning the level of the received reference signal at a plurality of earth stations.

10. An up-link power control system according to claim 1, wherein said satellite communication system is a TDMA system.

11. An up-link power control system according to claim 1, wherein said satellite communication system is a FDMA system.

12. An up-link power control system according to claim 4, wherein said level difference detecting means is realized based upon the combination of square means absolute values $(|\overline{A}|)^2$ of the reference and its own signals.

* * * * *